Patented Sept. 25, 1951

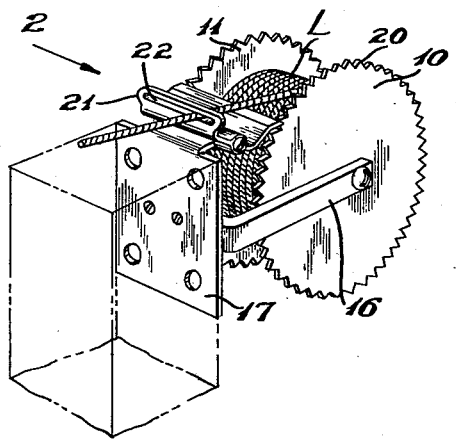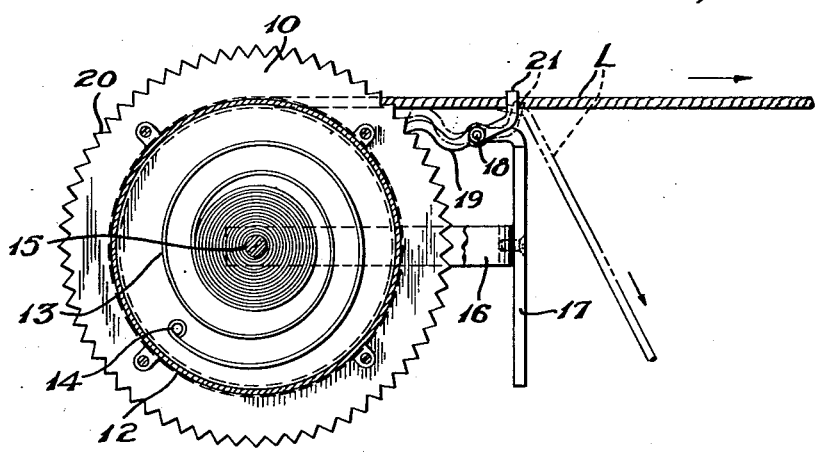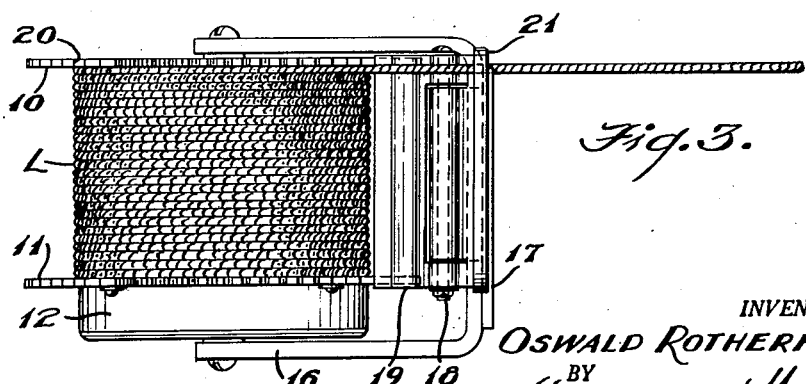

2,569,020

UNITED STATES PATENT OFFICE 2,569,020

CLOTHESLINE REEL

Oswald Rotherham, Hermosa Beach, Calif.

Application August 30, 1946, Serial No. 694,101

3 Claims. (Cl. 242—102)

This invention relates to improvements in clothesline reels and similar self-winding reels.

A primary object of the invention is to provide a self-winding reel, the sides of which have teeth engageable by a pawl to lock the reel against unwinding and to provide means associated with the pawl operable by manipulation of the withdrawn portion of the line that is normally wound upon the reel to cause the pawl to engage and disengage the teeth on the sides of the reel.

More specifically an object of the invention is to provide a clothesline reel having the above mentioned characteristics which is so designed that when the clothesline has been withdrawn from the reel and is suspended in a horizontal position, the pawl will be caused to lockingly engage the teeth on the reel to lock the reel against further unwinding movement. In this position clothes may be pinned on the suspended line. However, on swinging the withdrawn portion downwardly with relation to the reel, the pawl will be caused to release the reel and permit it to automatically wind up the clothesline after use.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the improved clothesline reel embodying the present invention;

Fig. 2 is a view in side elevation of the reel illustrated in Fig. 1;

Fig. 3 is a top plan view of the reel.

Referring to the accompanying drawings wherein similar reference characters designate similar parts throughout, the improved clothesline reel illustrated herein is of the self-winding type consisting of a drum having opposed sides or ends indicated at 10 and 11. On the side 11 there may be a spring housing 12 which encloses a spring 13 anchored as at 14 to the side 11 and to the shaft 15 on which the reel rotates. The spring 13 is biased or tensioned in such a direction as to cause the reel to be self-winding to wind up the line L thereon. By applying tension to the line the reel may be caused to unwind against the action of the spring 13. The shaft 15 is mounted on a suitable yoke 16 which is on a bracket or base plate 17 that may be mounted on a post or against the inside of the wall of a garage adjacent an opening in the wall.

On the base plate 17 there is pivotally mounted as at 18 a pawl 19 which is engageable with the teeth 20 on the edges of the ends 10 and 11. This pawl carries an upstanding arm 21 in which is formed an elongated slot 22 through which the withdrawn portion of the line L extends. This slot is preferably located approximately horizontally even with the top of the drum on which the line is wound.

The operation and advantages of the improved construction are substantially as follows: When it is desired to use the clothesline, the line may be withdrawn through the slot 22 while a downward pull is applied to the line. This pull is effective on the bottom of the slot 22 to swing the pawl 19 upwardly to release or disengage the teeth 20. When the required amount of line has been withdrawn and its end suitably attached to a remote support, the line on assuming an approximately horizontal position will allow the pawl 19 to swing in a counterclockwise direction, as viewed in Fig. 2, and engage the teeth 20. When the teeth are thus engaged further rotation of the reel in an unwinding direction is prevented so that the line L may be loaded without further unwinding. When it is desired to rewind the line L on the reel, its free end is merely detached and the spring of the reel will serve to wind it up thereon. During the wind-up action of the reel the teeth merely pass beneath the pawl, automatically lifting the pawl. It is to be observed, however, that upon withdrawing the line from the reel it is necessary to pull the line downwardly, as indicated in dotted lines, to hold the pawl out of engagement with the teeth during withdrawal. When the line has been completely withdrawn and is stretched in a substantially horizontal position, the pawl engages the teeth and prevents further unwinding from the reel even though the line is loaded.

The free end of the line is preferably knotted with a knot sufficiently large so that it will not pass through the slot 22, thus arresting the winding up of the line on the reel when the knot encounters the arm.

The pawl 19 may be of such a length as to automatically drop by gravity into engagement with the teeth 20 but if desired a spring may be used to constantly urge the pawl in this direction until the downwardly swung portion of the line L causes the arm 21 to disengage the teeth.

Various changes may be made in the details of construction without departing from the spirit or scope of the invention as defined by the appended claims.

I claim:
1. A clothesline reel comprising a self-winding reel having ratchet teeth thereon, a pawl engageable with the teeth pivotally mounted forwardly of the reel, said pawl having a guide arranged approximately horizontally even with the top of the reel and through which the line wound on the reel extends and being so arranged that when a line is withdrawn from the reel and remains approximately horizontal the pawl may engage the teeth to prevent further unwinding of the reel but when the line is swung downwardly the pawl will be shifted thereby to disengage the teeth.

2. A clothesline reel comprising a self-winding reel having teeth thereon, a pawl engageable with the teeth, and guide means on the pawl engageable by a portion of the line withdrawn from the reel, said guide means being so arranged that when the line extends approximately horizontally from the reel the pawl will be allowed to engage the teeth to prevent further unwinding rotation of the reel regardless of the tension applied to the line and when the line is depressed the pawl will be caused thereby to disengage the teeth allowing the reel to wind up the line or the line to unwind therefrom.

3. A clothesline reel comprising a self-winding reel having teeth on the sides thereof, a pawl extending across the reel engageable with the teeth, said pawl being pivotally mounted intermediate its ends and having at its forward end a guide extending across the reel and through which the line withdrawn from the reel extends, said guide being so arranged that when the line withdrawn from the reel extends approximately horizontally therefrom the pawl will be permitted to engage the teeth and prevent further unwinding rotation of the reel regardless of the tension applied thereto and when the line is seriously depressed from the horizontal the pawl will be caused to release the reel and permit the line to be wound thereon or be unwound therefrom.

O. ROTHERHAM.

REFERENCES CITED

The following references are of record in the file of this patent:

UNITED STATES PATENTS

| Number | Name | Date |
|---|---|---|
| 67,459 | Starritt | Aug. 6, 1867 |
| 760,801 | Nichols | May 24, 1904 |
| 2,039,915 | McCoy | May 5, 1936 |
| 2,181,141 | Lovegran | Nov. 28, 1939 |